US011663310B2

(12) United States Patent
Sarlo et al.

(10) Patent No.: US 11,663,310 B2
(45) Date of Patent: May 30, 2023

(54) ENTITLEMENT SYSTEM

(71) Applicant: Apple Inc., Cupertino, CA (US)

(72) Inventors: Joseph A. Sarlo, Cupertino, CA (US); Peter H. van der Veen, Ottawa (CA); Shawn R. Woodtke, Richmond (CA); Sunil Kittur, Kanata (CA)

(73) Assignee: Apple Inc., Cupertino, CA (US)

( * ) Notice: Subject to any disclaimer, the term of this patent is extended or adjusted under 35 U.S.C. 154(b) by 455 days.

(21) Appl. No.: 16/071,579

(22) PCT Filed: Jun. 26, 2018

(86) PCT No.: PCT/US2018/039584
§ 371 (c)(1),
(2) Date: Jul. 20, 2018

(87) PCT Pub. No.: WO2019/005857
PCT Pub. Date: Jan. 3, 2019

(65) Prior Publication Data
US 2020/0311240 A1 Oct. 1, 2020

Related U.S. Application Data

(60) Provisional application No. 62/526,319, filed on Jun. 28, 2017.

(51) Int. Cl.
*G06F 21/34* (2013.01)
*G06F 21/62* (2013.01)

(52) U.S. Cl.
CPC .......... *G06F 21/34* (2013.01); *G06F 21/6218* (2013.01)

(58) Field of Classification Search
USPC ........................................................... 707/3
See application file for complete search history.

(56) References Cited

U.S. PATENT DOCUMENTS

| 7,404,203 B2 | 7/2008 | Ng |
| 7,490,333 B2 | 2/2009 | Grimaud et al. |

(Continued)

FOREIGN PATENT DOCUMENTS

| CN | 101803330 A | 8/2010 |
| CN | 101877695 A | 11/2010 |

(Continued)

OTHER PUBLICATIONS

Graham Hamilton, Panos Kougiouris; "The Spring Nucleus: A Microkernel for Objects," SMLI TR-93-14 The SMLI Technical Report Series, Sun Microsystems Laboratories, Inc. Mountain View, CA 94043 USA Apr. 1993, 15 pages.

(Continued)

*Primary Examiner* — Jamie R Kucab
(74) *Attorney, Agent, or Firm* — Kowert, Hood, Munyon, Rankin & Goetzel, P.C.

(57) ABSTRACT

In an embodiment, a central repository of rights may be implemented, and accessing entities (e.g. clients) and entities for which access is controlled (e.g. files, servers, etc.) may rely on the central repository. The rights may vary on a client-by-client basis. In an embodiment, the rights may be managed as a value that is interpreted by the access-controlled entity. Accordingly, the definition of access rights may vary based on the entity. In an embodiment, visibility to the access rights may be limited. For example, the central repository may provide a handle that is associated with the access rights, but the access rights themselves may not be provided. When an accessing entity attempts to access the access-controlled entity, the handle may be used to identify the access rights. The handle may be presented to the central repository by the access-controlled entity to confirm access rights.

12 Claims, 6 Drawing Sheets

(56) References Cited

U.S. PATENT DOCUMENTS

| | | | | |
|---|---|---|---|---|
| 7,739,299 | B2* | 6/2010 | Kii | G06Q 30/06 707/783 |
| 8,233,624 | B2* | 7/2012 | Ollikainen | H04L 63/08 713/193 |
| 8,234,301 | B2* | 7/2012 | Kii | G06Q 30/06 707/781 |
| 9,635,540 | B2* | 4/2017 | Mullen | H04W 8/14 |
| 2006/0130150 | A1 | 6/2006 | Garza-Gonzalez et al. | |
| 2007/0049290 | A1* | 3/2007 | Mullen | H04W 8/14 455/456.1 |
| 2008/0184336 | A1* | 7/2008 | Sarukkai | G06F 21/6218 726/1 |
| 2009/0054092 | A1* | 2/2009 | Stonefield | G06Q 30/0601 705/26.1 |
| 2009/0157637 | A1* | 6/2009 | Kii | G06Q 30/06 |
| 2009/0300773 | A1* | 12/2009 | Pal | H04H 60/31 726/27 |
| 2010/0135473 | A1* | 6/2010 | Dewing | H04L 65/1094 379/88.13 |
| 2013/0191884 | A1 | 7/2013 | Leicher et al. | |
| 2016/0188891 | A1* | 6/2016 | Schlesinger | G06F 21/00 726/1 |

FOREIGN PATENT DOCUMENTS

| | | |
|---|---|---|
| CN | 104166812 A | 11/2014 |
| CN | 104363229 A | 2/2015 |
| EP | 2 966 831 A1 | 1/2016 |
| EP | 2966831 A1 | 1/2016 |
| FR | 2773235 A1 | 7/1999 |
| WO | 9935552 A1 | 7/1999 |

OTHER PUBLICATIONS

QNX Neutrino RTOS System Architecture, QNX Software Development Platform 6.6., QNX Software Systems Limited, 1001 Farrar Road, Ottawa, Ontario, K2K 0B3 Canada, printed from internet, Feb. 20, 2014, 324 pages.

Mach: A New Kernel Foundation for UNIX Development; Mike Accetta, Robert Baron, William Bolosky, David Golub, Richard Rashid, Avadis Tevanian and Michael Young Computer Science Department, Carnegie Mellon University Pittsburgh, Pa. 15213, Apr. 1986, 16 pages.

http://www.oracle.com/technetwork/indexes/documentation/index.html, Sun Microsystems, Inc. 901 San Antonio Road Palo Alto, CA 94303-4900 U.S.A. Documentation Home, ChorusOS 5.0 Features and Architecture Overview,Chapter 2 Architecture and Benefits of the ChorusOS Operating System, printed from the internet, Dec. 18, 2017, 17 pages.

IPRP, PCT/US2018/039584, dated Jan. 9, 2020, 7 pages.

ISR/WO, PCT/US2018/039584, dated Oct. 1, 2018, 1 pages.

D Hardt: "RFC 6749 The OAuth 2.0 Authorization Framework", Oct. 31, 2012 (Oct. 31, 20012), pp. 1-76, XP055218558, Retrieved from the Internet: URL:https://www.rfc-editor.org/rfc/pdfrfc/rfc6749.txt.pdf [retrieved on Oct. 6, 2015].

Examination Report, European Patent Application No. 18743646.4, dated Dec. 17, 2021, 5 pages.

D. Hardt, "RFC 6749 The OAuth 2.0 Authorization Framework,"Oct. 31, 2012 (2012-20-31), pp. 1-76, XP055218558.

Office Action in Chinese Appl. No. 201880038295.8 dated Dec. 16, 2023, 10 pages.

* cited by examiner

ENTITLEMENT SYSTEM

This application is a 371 of PCT Application No. PCT/US2018/039584, filed Jun. 26, 2018, which claims benefit of priority to U.S. Provisional Patent Application Ser. No. 62/526,319, filed on Jun. 28, 2017. The above applications are incorporated herein by reference. To the extent that any material in the incorporated application conflicts with material expressly set forth herein, the material expressly set forth herein controls.

BACKGROUND

Technical Field

This disclosure relates generally to electronic systems and, more particularly, to operating systems on such electronic systems.

Description of the Related Art

Most electronic systems (e.g. computing systems, whether stand alone or embedded in other devices) have a program which controls access by various other code executing in the system to various hardware resources such as processors, peripheral devices, memory, etc. The program also schedules the code for execution as needed. This program is typically referred to as an operating system.

Another service supported by many operating systems is access control. Access control may be applied to any entity (e.g. a file, a server, a hardware device, an operating system service, a collection of any of the above, etc.). The access control determines which other entities (e.g. specific clients, specific applications, etc.) are permitted access to the entity, and the type/amount of permitted access. If a first entity requests access to a second entity and the access control assigned between the first entity and the second entity does not permit that access, the access is denied. If the access control permits the requested access, the access is permitted.

Typically, the access control is associated with the entity for which access is being controlled (e.g. the second entity as mentioned above). The access control is generally visible to all users and controlled by both an owner of the entity and an administrator: a user with heightened privileges in the system. In some cases, there may be multiple administrators as well. Typically, the access control is limited in both scope (the types of access provided) and granularity (the individuality with which access control can be assigned). For example, Linux operating systems provide access control to files with three types (read, write, and execute) and the control is assigned to three groups (owner, administrator-level users, and other users). The lack of granularity and the visibility of the access control reduces overall security (e.g. if one user needs access, every user in group is permitted that same access). Furthermore, the ability to change the access rights by multiple entities reduces security as well.

SUMMARY

In an embodiment, a system for controlling access is provided. A central repository of rights may be implemented, and both accessing entities (e.g. clients) and entities for which access is controlled (e.g. files, servers, etc.) may rely on the central repository for the rights. The rights may be associated with the accessing clients, and thus may vary on a client-by-client basis.

In an embodiment, the rights may be managed as a value that is interpreted by the access-controlled entity. Accordingly, the definition of access rights may vary based on the entity. For example, a server may provide a set of services. The access rights may define which services a given entity is permitted to access. Furthermore, some services may have different levels of service, and the level provided for a given entity may be controlled. Other access-controlled entities may have different access rights definitions. For example, files may have read, write, and execute rights; a hardware device may have rights to the operations the device performs, etc.

In an embodiment, visibility to the access rights may be limited. For example, the central repository may provide a handle that is associated with the access rights, but the access rights themselves may not be provided. When an accessing entity attempts to access the access-controlled entity, the handle may be used to identify the access rights. The handle may be presented (by the access-controlled entity) to the central repository, which may provide the access rights value to the access-controlled entity. Alternatively, the central repository may vet the access against the accessing-entity's access rights, returning a permitted/not permitted response to the access-controlled entity, in other embodiments.

BRIEF DESCRIPTION OF THE DRAWINGS

The following detailed description makes reference to the accompanying drawings, which are now briefly described.

Figure 1:
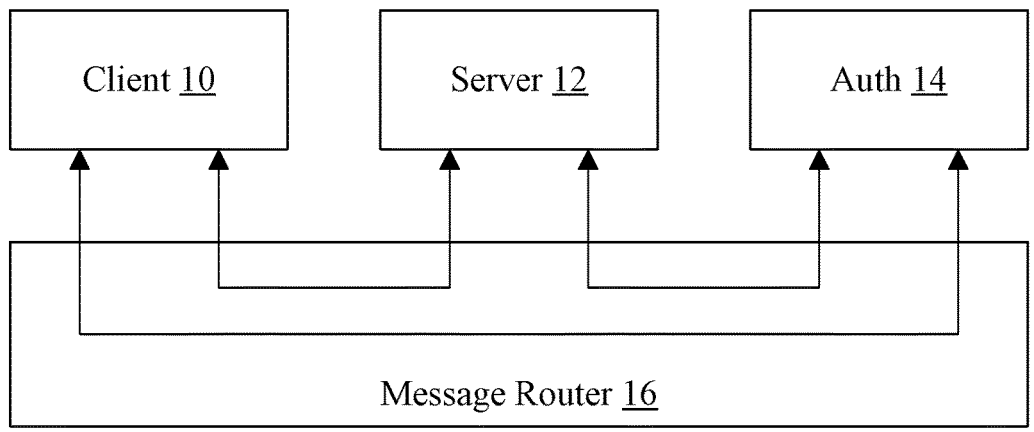
FIG. 1 is a block diagram of one embodiment of an operating system and various other entities.

While this disclosure may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. Generally, this disclosure is not intended to refer to one particular implementation, but rather a range of embodiments that fall within the spirit of the present disclosure, including the appended claims.

DETAILED DESCRIPTION OF EMBODIMENTS

In an embodiment, the access rights for a system may be maintained in a central repository. In this description, access rights are referred to as "entitlements," since the rights are conferred on an accessing entity with respect to a given access-controlled entity. Generally, the entitlements of an accessing entity may control which interactions with an access-controlled entity are permitted for the accessing entity. The interactions may be access-controlled-entity specific. For example, a server may support two or more services. The entitlements for the accessing entity may specify which services the accessing entity is permitted to request. A file may have read, write, and execute entitlements. Thus, an accessing entity may have read, write, and execute interactions controlled independently. A hardware device may have access/no access entitlements, configuration change entitlements, and/or transmit/receive entitlements. An accessing entity may be permitted or denied access based on the access/no access entitlements. The accessing entity may be permitted or denied configuration change requests based on the configuration change entitlements. The accessing entity may be permitted or denied transmission or reception based on the transmit/receive entitlements Any set of interactions may be supported on an accessing-entity basis. Additionally, while examples are described in greater detail below with regard to an accessing entity and an access-controlled entity, entitlements may be applied in both directions for peers (e.g. each peer may be an accessing entity to the other peer, based on a set of entitlements). Furthermore, the controlled access is not limited to two entities, but may rather control interaction among three or more entities. For example, each entity may have a set of entitlements for each other entity in the interaction.

In an embodiment, the central repository (referred to as an authenticator herein) may have a set of entitlements that are assigned at the time that the operating system and other software components of the system are built. In some embodiments, the entitlements may be changed dynamically during use, but begin with the set that was created during the build. In an embodiment, an accessing entity may vend its entitlements to another entity, and may further limit the entitlements (but may not expand them). In an embodiment, expansion of entitlements for a given accessing entity may be controlled by the accessed entity, or may be controlled by the accessed entity in conjunction with the authenticator or other trust-controlling entity. In other embodiments, the entitlements may be set at build and may not be dynamically changed.

An example will be described in greater detail below, using a client and a server and client entitlements with respect to the server. However, other embodiments may employ any accessing entity and accessed entity and/or any combination of accessing entities and accessed entities.

FIG. 1 is a block diagram of one embodiment of components of a system that may implement entitlements. As illustrated in FIG. 1, the components may include a client 10, a server 12, an authenticator (auth) 14, and a message router 16. The various components may be executed on one or more computer systems. If more than one computer system is used, the message router 16 may be executed on each computer system and may communicate with the message router 16 on other computer systems to route messages between the client 10, the server 12, and the auth 14. If the client 10, the server 12, and the auth 14 are all executed on the same computer system, the message router 16 may be the operating system on the computer system (or may be part of the operating system).

Communication between components (e.g. the client 10, the server 12, and the auth 14) may be in the form of messages that are communicated via the message router 16. For example, components that wish to communicate may establish channels in the message router 16. The message router 16 may assign a channel identifier (Cid) to the channel, and the transmitting component may use the Cid in the message to identify the receiving component. In an embodiment, the owner of the channel (the component which establishes the channel) may associate a token with the channel. The token may be unforgeable (that is, no other entity may know the token, it may be hidden in the message). The token may help the channel owner in determining that the message was indeed from the entity to which the channel was formed, or for from another entity to which that entity vended the channel, if permissible.

In an embodiment, a client 10 may request and receive an authentication (auth) "handle" that may be used to identify the client's entitlements for a given server 12. That is, the handle is not just a handle to a set of entitlements, but also indicates the client's ownership of the entitlements. The handle may be opaque, meaning that the handle cannot be used to view the actual entitlements. The client 10 may use the handle to identify the entitlements that the client 10 has for the given server 12, either by transmitting the handle to the server 12 or requesting that the auth 14 transmit the rights (or an authentication for an operation) to the server 12. Embodiments of both mechanisms are described in more detail below.

It is noted that, while a client 10 and a server 12 are illustrated in FIG. 1, the same components may reverse roles for another interaction. That is, the component acting as the client 10 in one interaction may be the server 12 in another interaction, and the server 12 may be the client 10 in that other interaction.

Figure 2:
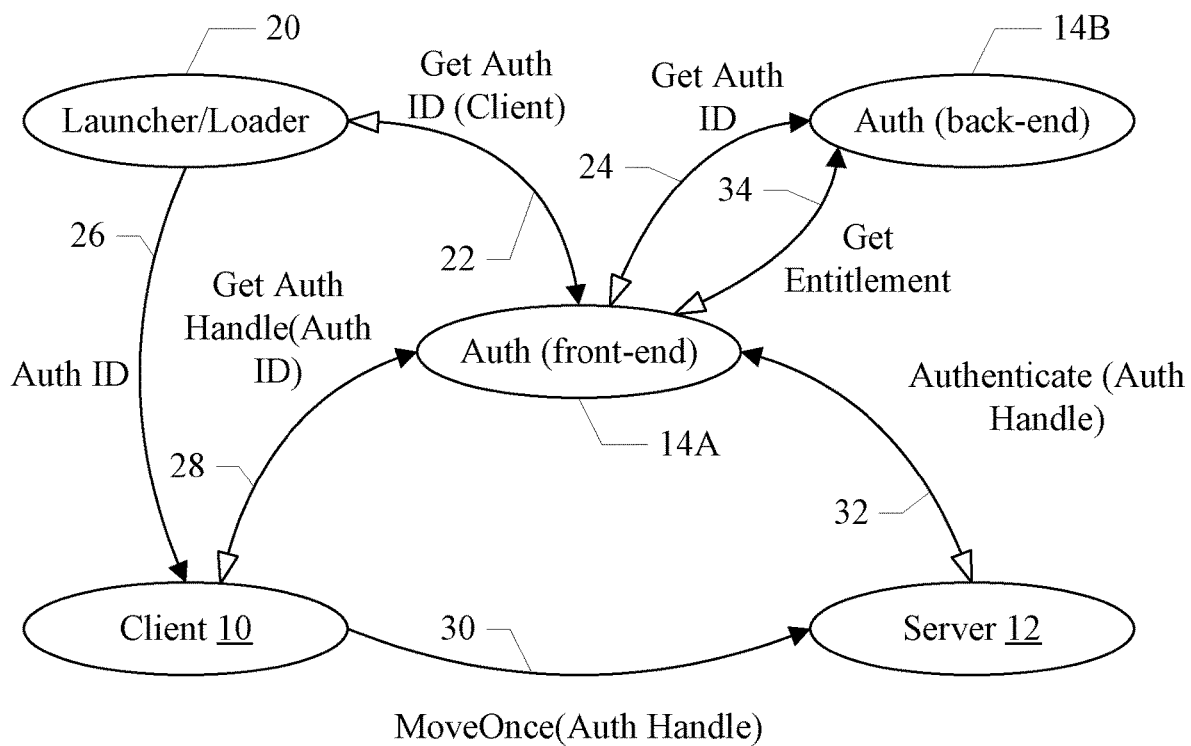
FIG. 2 is a block diagram of one embodiment of communication between entities to determine access rights.

FIG. 2 is a block diagram illustrating one embodiment of communications among the client 10, server 12, auth 14, and a launcher/loader 20 to manage entitlements and authentication of the entitlements in a system. The auth 14 is shown in two portions, a front-end 14A and a back-end 14B. The arrows in FIG. 2 represent communications between the various entities (e.g. a channel between the entities). An arrow with a closed head (black) illustrates a command or request channel, and an arrow with an open head (white) illustrates a response channel. The command/request channel and the response channel may be the same channel, or may be separate channels, in various embodiments.

The launcher/loader 20 may be the code that initializes a system or systems to execute the client 10, the server 12, and the auth 14. The launcher/loader 20 may also load the code corresponding to the client 10, the server 12, and the auth 14 into memory in the system and thus provides the beginning of a chain of trust between the launcher/loader 20 to the client 10, the server 12, and the auth 14.

As mentioned above, the auth 14 is illustrated in FIG. 2 as the auth front-end 14A and the auth back end 14B. The auth front-end 14A may include the interfaces to other entities in the system and may manage messages from the various client and server entities in the system for verifying entitlements. The auth back-end 14B may include the management of the entitlements for the clients. In one embodiment, an entitlement may be a key-value pair. The value may be defined by the server 12 or other access-controlled entity, and thus may differ for different servers/entities. In such embodiments, the auth 14 may not attempt to interpret the entitlement, but may instead provide the entitlement to the server 12 to interpret.

When launcher/loader 20 is launching the client 10, the launcher/loader 20 may request an auth ID from the auth front-end 14A (arc 22). The request may include a name of the client 10, which may be used to identify the client to assign the auth ID. The auth ID may identify the client in the auth ID system for authentication/entitlement requests. The auth front-end 14A may transmit a message to the auth back-end 14B to obtain the auth ID, which the auth back end may return (arc 24) to the auth front-end 14A. The auth front-end 14A may return the auth ID to the launcher/loader 20 (arc 22). The launcher/loader 20 may transmit the auth ID to the client 10 when launching the client 10 (arc 26).

When the client 10 is to employ a service from the server 12, the client 10 may request a handle to its entitlements from the auth front-end 14A (arc 28). The request may include the auth ID of the client 10 and a key that identifies the server 12 among various servers or other entities to which the client 10 may have entitlements. The may be a public key associated with the server 12, for example. Alternatively, the key may be any identifier which uniquely identifies the server among the entities for which the auth 14 has entitlements. As mentioned above, the auth handle identifies not only the entitlements, but the client's ownership of those entitlements, and thus is labeled as an auth handle in FIG. 2. The auth front-end 14A may respond with the auth handle. The auth handle may be opaque to the client 10. That is, the client 10 may not be able to view its entitlements. Security in the system may be improved by keeping the value secret from the client 10 (and thus the value that would represent other entitlements may not be inferred by the client 10 or other entities which attempt to monitor communications to detect the entitlement values supported by the server 12).

The client 10 may transmit the auth handle using a move once message to the server 12 (arc 30). A move once message may permit a given object to be moved from the source (e.g. client 10) to the destination (e.g. server 12). The destination may receive the move once message and may use the contents (e.g. to read the entitlements from the auth system 14) but cannot transmit the auth handle to another entity except the entity that created the object (e.g. the auth 14, in this case). The move once operation may be enforced by the message router 16. Since the auth handle cannot be moved by the receiver of the move once message, the receiver may not attempt to impersonate the client 10 to other entities. Viewed in another way, the receiver of a move once message may transmit the contents of the message (the auth handle) to the source of the contents (the auth 14 in this case) but may not transmit them elsewhere. In other embodiments, other semantics than the move once semantics may be used.

The server 12 may transmit an authenticate message to the auth front-end 14A including the handle, to obtain the entitlements for the client 10 (arc 32). The auth front-end 14A may query the auth back-end 14B to obtain the entitlement (arch 34) and may return the entitlement to the server 12 (arc 32).

In an embodiment, the channels represented by the arcs 22, 24, 26, 28, 30, 32, and 34 may be managed by yet another entity (a channel entity) that establishes channels and assigns channel IDs and tokens to the channels. The tokens may be unforgable, and may thus serve as evidence that the message transmitter is using the channel that was assigned to the transmitter by the channel entity.

Figure 3:
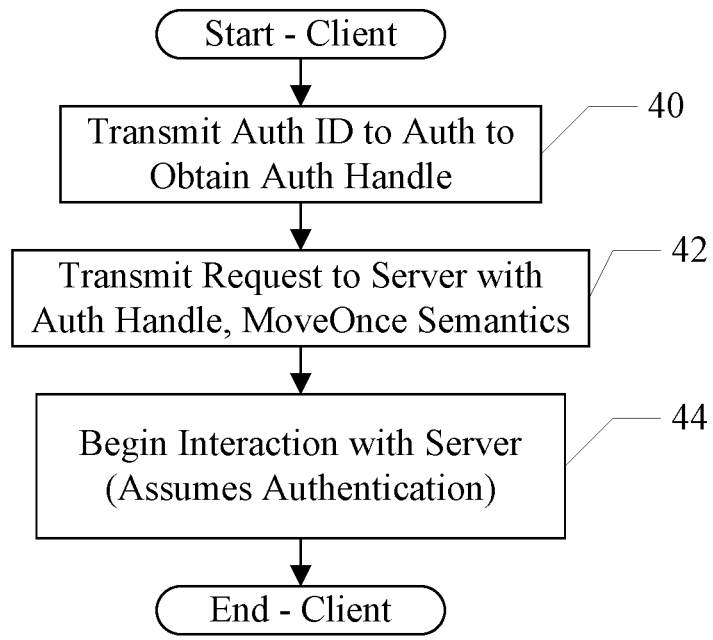
FIG. 3 is a flowchart illustrating operation of one embodiment of the client in the communication mechanism of FIG. 2.

Turning now to FIG. 3, a flowchart is shown illustrating operation of one embodiment of the client 10 for the embodiment of FIG. 2. While the blocks are shown in a particular order for ease of understanding, other orders may be used. The client 10 may include instructions which, when executed, cause a computer to implement the operation shown in FIG. 3. The client 10 may be configured to implement the operation shown in FIG. 3.

The client 10 may transmit the auth ID provided by the launcher/loader 20 in a get auth handle command (block 40). As mentioned previously, the command may include a key for the server 12 (e.g. the public key of a public/private key pair in an embodiment) to identify the server among the entitlements that may be available for the client 10. That is, the client 10 may have entitlements for multiple different servers 12. When the auth handle is returned to the client 10 from the auth front-end 14A, the client 10 may transmit a command to authenticate with the server 12, providing the auth handle in the message and using the move once message type mentioned above (block 42). Assuming that the authentication is successful (i.e. the client 10 indeed has the entitlements needed for the desired interaction with the server 12), the client 10 may begin interaction with the server 12 (block 44). The interactions will be controlled by the entitlements received by the server 12 from the auth 14. That is, if the client 12 is not permitted a particular interaction based on the entitlements, the particular interaction may fail even though other interactions operate successfully.

Figure 4:
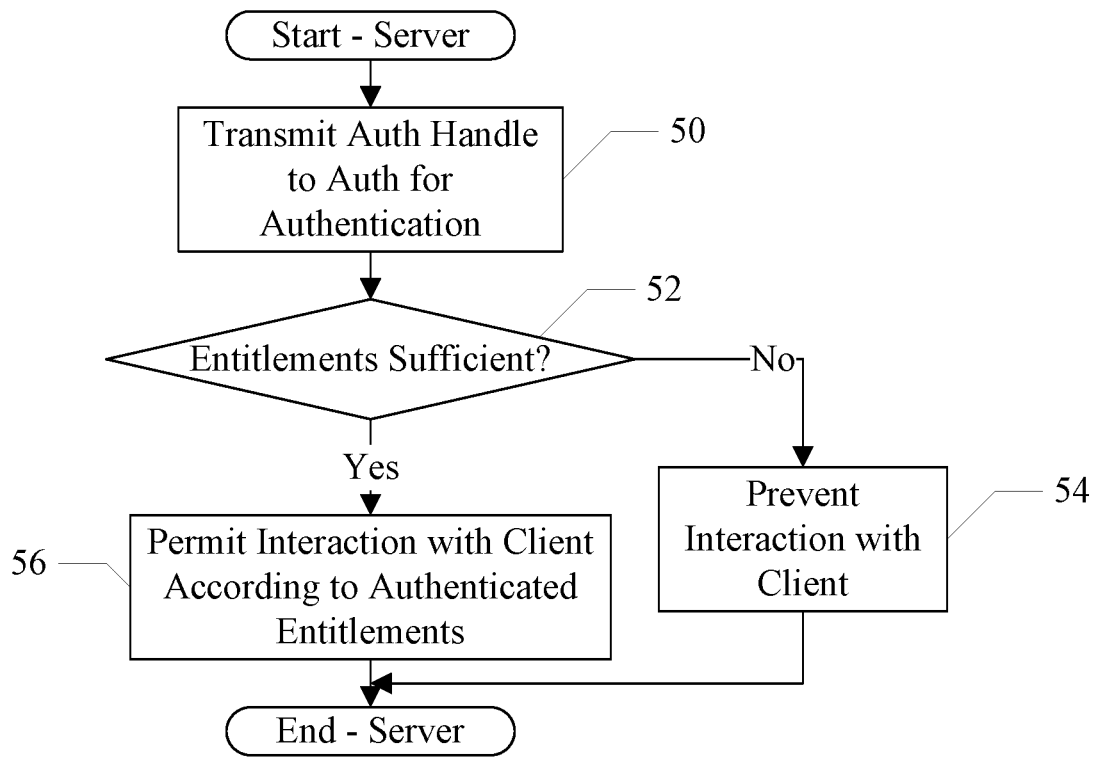
FIG. 4 a flowchart illustrating operation of one embodiment of the server in the communication mechanism of FIG. 2.

FIG. 4 is a flowchart illustrating one embodiment of the server 12 for the embodiment of FIG. 2. While the blocks are shown in a particular order for ease of understanding, other orders may be used. The server 12 may include instructions which, when executed, cause a computer to implement the operation shown in FIG. 4. The server 12 may be configured to implement the operation shown in FIG. 4.

In response to receiving the auth handle from the client 10, the server 12 may transmit the handle to the auth front-end 14A for authentication (block 50). The server 12 may receive the corresponding entitlements back from the auth front-end 14A, and may determine if the entitlements are sufficient to permit the client 10 to interact with the server 12. If the entitlements are not sufficient for any interaction (decision block 52, "no" leg), the server 12 may prevent any interaction with the client 10 (block 54). For example, messages from the client 10 may ignored. If the entitlements are sufficient (decision block 52, "yes" leg), the server 12 may permit interaction with the client 10 according to the authenticated entitlements (block 56).

Figures 5, 6, 7:
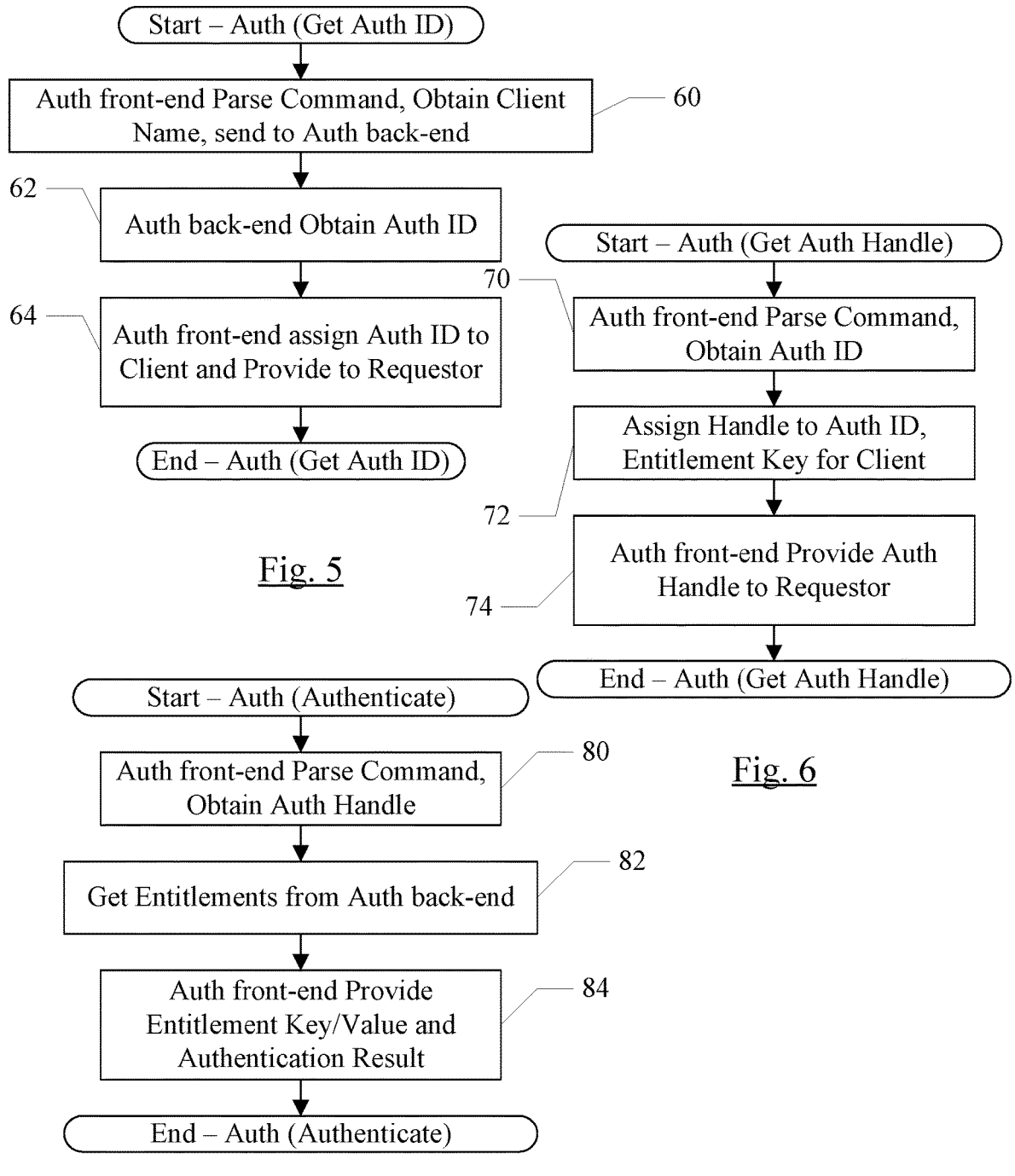
FIGS. 5-7 are flowcharts illustrating operation of one embodiment of the authenticator in the communication mechanism of FIG. 2.

FIGS. 5-7 are flowcharts illustrating operation of one embodiment of the auth 14 for the embodiment of FIG. 2. While the blocks are shown in a particular order for ease of understanding, other orders may be used. The auth 14 (more particularly the auth front-end 14A and the auth back-end 14B) may include instructions which, when executed, cause a computer to implement the operation shown in FIGS. 5-7. The auth front-end 14A and the auth back-end 14B may be configured to implement the operation shown in FIGS. 5-7.

FIG. 5 illustrates one embodiment of operation of the auth 14 in response to a Get Auth ID command from the launcher/loader 20. The auth front-end 14A may parse the command to determine that it is the Get Auth ID command, and may obtain the client name. The auth front-end 14A may send the client name to the auth back-end 14B (block 60). The auth back-end 14B may obtain the auth ID for the client based on the client name, and may return the auth ID to the auth front-end 14A (block 62). The auth front-end 14A may assign the auth ID to the client 10 and may return the auth ID to the requestor (block 64). In this case, the requestor may be the launcher/loader 20.

FIG. 6 illustrates one embodiment of operation of the auth 14 in response to a Get Auth Handle command from the client 10. The auth front-end 14A may parse the command to determine that it is the Get Auth Handle command, and may obtain the auth ID from the command (block 70). The auth front-end 14A may assign a handle to the auth ID (block 72), which may be opaque to the client 10. That is, the client 10 may not use the handle to access the entitlements. In an embodiment, the auth front-end 14A may not even communicate the auth ID to the auth back-end 14B to obtain the entitlements. Instead, the auth front-end 14A may record the handle with the auth ID and the key provided by the client 10. The auth front-end 14A may respond to the client 10 with the handle (block 74).

FIG. 7 illustrates one embodiment of operation of the auth 14 in response to an Authenticate command from the server 12. The auth front-end 14A may parse the command to determine that it is the Authenticate command, and may obtain the auth handle (block 80). The auth front-end 14A may obtain the entitlements from the auth back-end 14B (block 82), and may return the entitlements and authentication result of success to the server 12 (block 84). If the entitlements are not successfully obtained, the auth front-end 14A may transmit null entitlements and the authentication result of failure to the server 12 (block 84).

Figure 8:
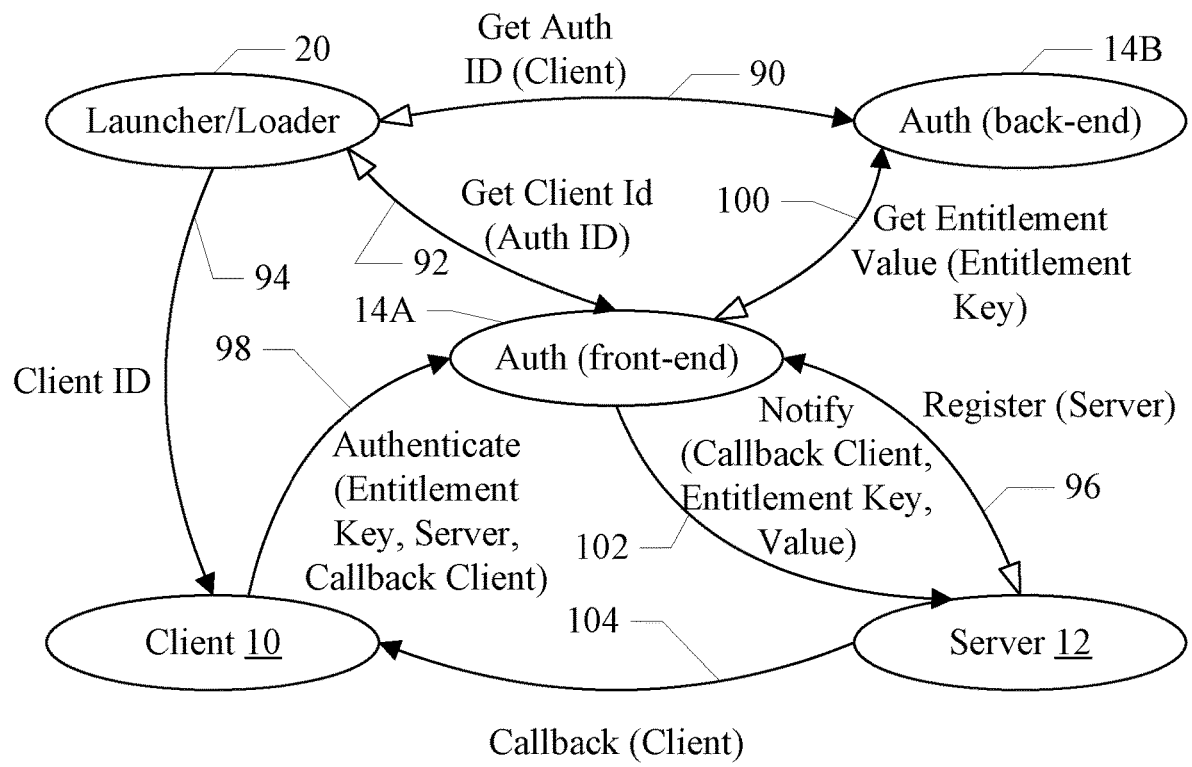
FIG. 8 is a block diagram of another embodiment of communication between entities to determine access rights.

Turning next to FIG. 8, a block diagram is shown of another embodiment of communications among the client 10, server 12, auth 14, and a launcher/loader 20 to manage entitlements and authentication of the entitlements in a system. Similar to FIG. 2, the auth 14 is shown in two portions, a front-end 14A and a back-end 14B. In this embodiment, a "push through auth" model is used for authenticating entitlements. That is, rather than providing an opaque handle to the client 10, to provide to the server 12, the client 10 may request that the auth 14 transmit the entitlements to the server 12. The embodiment of FIG. 8 may employ some asynchronous communications and may rely on callbacks to communicate some messages.

In this embodiment, the launcher/loader 20 may communicate directly with the auth back-end 14B to obtain an auth ID for the client 10, and may use the auth ID to obtain a client ID (arcs 90 and 92, respectively). In another embodiment, both IDs may e acquired through communication to the auth front-end 14A. The launcher/loader 20 may load the client 10 and pass the client its client ID (arc 94). The client 10 may not be provided with its auth ID, however. The client 10 may also be provided with an ID of the server 12, either through the launcher/loader 20, the auth front-end 14A, or some other mechanism in various embodiments.

The server 12 may similarly have been started and provided with an ID. The server 12 may register with the auth front-end 14A, which may assign a second ID to the server 12 (arc 96). The second ID may be used to identify the server 12 but may not be used to communicate with the server 12. The second ID may be the ID provided to the client 12 as mentioned above.

When the client 10 determines that it needs a service from the server 12, the client 10 may transmit an authenticate command to the auth front-end 14A, requesting that the auth 14 authenticate the client's entitlements to the server 12 (arc 98). The authenticate command may include a key identifying the entitlement ("Entitlement Key" in the authenticate command in FIG. 8), the server ID ("Server" in the authenticate command in FIG. 8), and a callback address for the client 10 ("Callback Client" in the authenticate command it FIG. 8). The auth front-end 14A may query the auth back-end 14B with the entitlement key to obtain the entitlement value (arc 100), and may transmit a notify message to the server with the callback client address, the entitlement key, and the entitlement value (arc 102). In response, the server 12 may transmit a callback to the client 10 (arc 104) to initiate interaction with the client 10. The interaction may be controlled by the entitlements assigned to the client 10. The client 10 may not have direct access to the entitlements. The server 12 may not have direct access to the entitlements either, until the entitlements have been authenticated by a trusted third party (auth 14).

Figure 9:
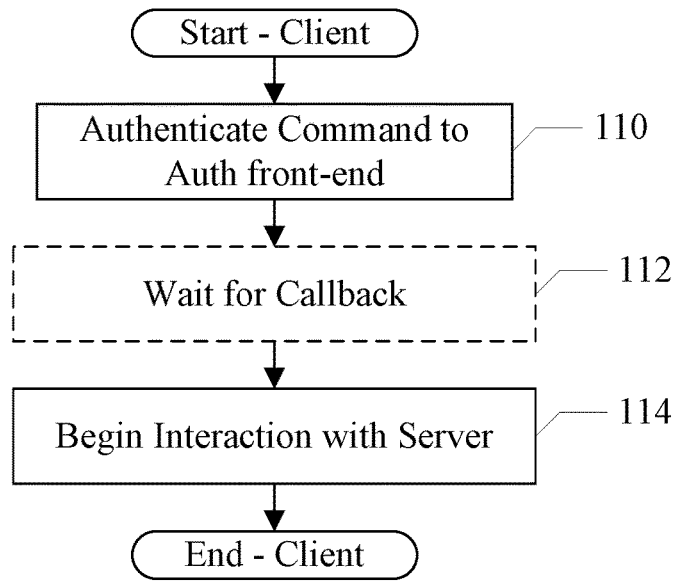
FIG. 9 is a flowchart illustrating operation of one embodiment of the client in the communication mechanism of FIG. 8.

FIG. 9 is a flowchart illustrating operation of one embodiment of the client 10 for the embodiment of FIG. 8, when the client 10 has determined that a service from the server 12 is needed. While the blocks are shown in a particular order for ease of understanding, other orders may be used. The client 10 may include instructions which, when executed, cause a computer to implement the operation shown in FIG. 9. The client 10 may be configured to implement the operation shown in FIG. 9.

The client 10 may transmit an authenticate command to the auth front-end 14A, requesting that the auth 14 authenticate the client's entitlements to the server 12 (block 110). The client 10 may then wait for a callback from the server 12 (block 112). Waiting for the callback may include the client 10 going to sleep, or performing other work that does not involve the server 12, in various embodiments. Once the callback occurs, the client may begin interaction with the server 12 (block 114). The server 12 may limit the interaction based on the entitlements. The client 10 may be designed with an expectation of the entitlements it will have during execution, and thus should not violate the entitlements via the interaction. Since the client 10 does not have direct access to the entitlements, it may not be able to attempt to spoof entitlements that it does not have (e.g. if the client 10 has been replaced by nefarious code).

Figure 10:
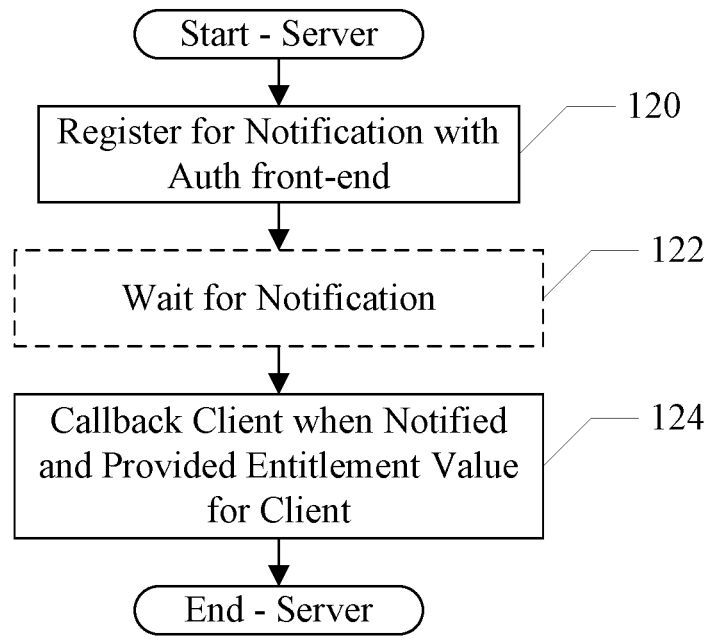
FIG. 10 a flowchart illustrating operation of one embodiment of the server in the communication mechanism of FIG. 8.

FIG. 10 is a flowchart illustrating operation of one embodiment of the server 12 for the embodiment of FIG. 8. While the blocks are shown in a particular order for ease of understanding, other orders may be used. The server 12 may include instructions which, when executed, cause a computer to implement the operation shown in FIG. 10. The server 12 may be configured to implement the operation shown in FIG. 10.

The server 12 may register for notification of client authentications for its services (block 120). The server 12 may then wait for a callback with the notification (block 122). Similar to the discussion with regard to the client 10 above, the server 12 may wait for the notification by going to sleep, or performing other work (e.g. responding to requests from other clients). When the notification arrives, the server 12 may callback the client 10 to permit the client 10 to begin interacting with the server 12, based on the entitlements delivered for the client 10 to the server 12 (block 124).

Figure 11:
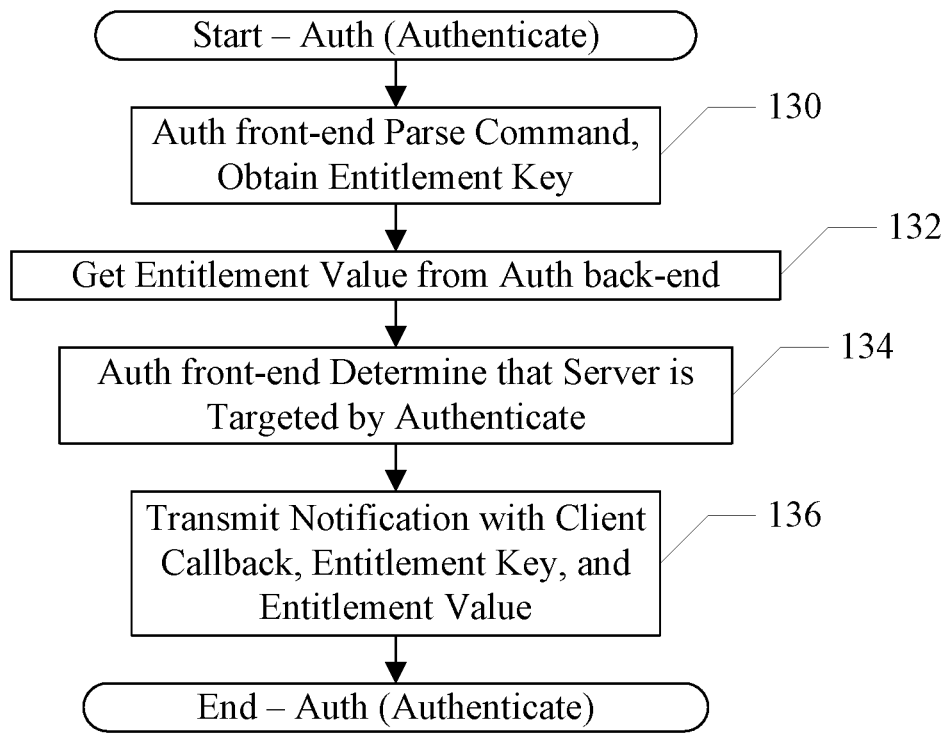
FIG. 11 is a flowchart illustrating operation of one embodiment of the authenticator in the communication mechanism of FIG. 2.

FIG. 11 is a flowchart illustrating operation of one embodiment of the auth 14 in response to an authenticate command from the client 10 for the embodiment of FIG. 8. While the blocks are shown in a particular order for ease of understanding, other orders may be used. The auth 14 (and more particularly the auth front-end 14A and the auth back-end 14B) may include instructions which, when executed, cause a computer to implement the operation shown in FIG. 11. The auth front-end 14A and the auth back-end 14B may be configured to implement the operation shown in FIG. 11.

The auth front-end 14A may parse the authenticate command and obtain the entitlement key from the command (block 130). The auth front-end 14A may use the key to obtain the corresponding entitlement value from the auth back-end 14B (block 132). In the case that there is no entitlement value for the client 10 (which would be an error), the auth back-end may return a null entitlement value so that the server 12 may be informed that the client 10 has no entitlements. The auth front-end 14A may determine from the authenticate command that the server 12 is the target of the authenticate (block 134), and my transmit a notification with the client callback address, the entitlement key, and the entitlement value (block 136).

Figure 12:
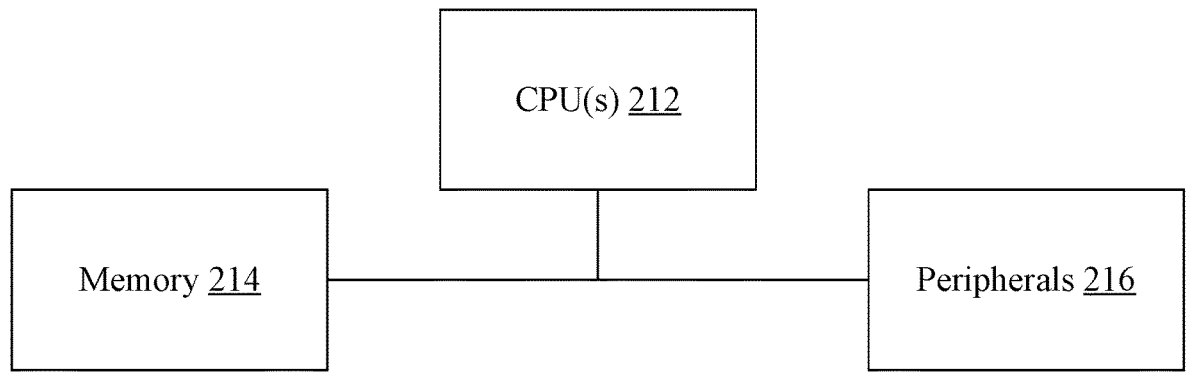
FIG. 12 is a block diagram of one embodiment of a computer system.

Tuning now to FIG. 12, a block diagram of one embodiment of an exemplary computer system 210 is shown. In the embodiment of FIG. 12, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein such as client 10, the server 12, the auth 14 (including the auth front-end 14A and the auth back-end 14B), and the message router 16. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Figure 13:
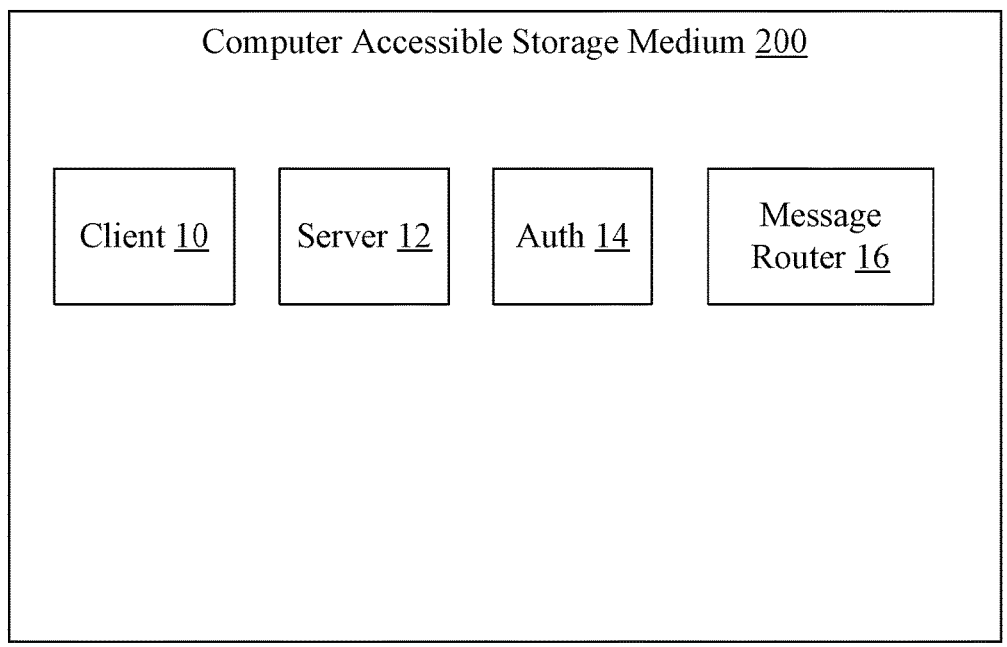
FIG. 13 is a block diagram of one embodiment of a computer accessible storage medium.

Peripheral devices 216 may represent any sort of hardware devices that may be included in the computer system 210 or coupled thereto (e.g. storage devices, optionally including a computer accessible storage medium 200 such as the one shown in FIG. 13), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC).

The computer system 210 may be any sort of computer system, including general purpose computer systems such as desktops, laptops, servers, etc. The computer system 210 may be a portable system such as a smart phone, personal digital assistant, tablet, etc. The computer system 210 may also be an embedded system for another product.

FIG. 13 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 13 may store code forming the client 10, the server 12, the auth 14 (e.g. the auth front-end 14A and the auth back-end 14B, and the message router 16). The client 10, server 12, auth 14, and message router 16 may comprise instructions which, when executed, implement the operation described above for these components. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. An embedded computer system storing a central repository of entitlements, an accessing entity, and an access-controlled entity, the embedded computer system, comprising:
   one or more processors; and
   a non-transitory computer accessible storage medium coupled to the one or more processors and storing a plurality of instructions which, when executed by the one or more processors:
   transmit a first command from the accessing entity to the central repository requesting a handle to one or more entitlements for the accessing entity to services provided by the access-controlled entity;
   respond to the first command by the central repository with the handle, which is opaque to the accessing entity whereby the accessing entity is unable to access the one or more entitlements;
   transmit, by the accessing entity, the handle to the access-controlled entity in a move once command that prevents the access-controlled entity from transmitting the handle to entities other than the central repository;
   receive a second command in the central repository of entitlements from the access-controlled entity, wherein the second command includes the handle and requests the one or more entitlements;
   locate the one or more entitlements in the central repository of entitlements;
   transmit the one or more entitlements from the central repository of entitlements to the access-controlled entity for interpretation by the access-controlled entity, wherein the access-controlled entity is configured to determine, based on the one or more entitlements, whether or not the accessing entity is permitted to access the services provided by the access-controlled entity, wherein the central repository securely stores and provides the one or more entitlements to the access-controlled entity and prevents the accessing entity from having visibility to the one or more entitlements;
   receive the one or more entitlements in the access-controlled entity from the central repository of entitlements;
   determine, by the access-controlled entity, if the one or more entitlements are sufficient for the accessing entity to access the services provided by the access-controlled entity; and
   selectively permit, by the access-controlled entity, the accessing entity to access the access-controlled entity based on the determination of whether or not the accessing entity is permitted to access the services provided by the access-controlled entity.

2. The embedded computer system as recited in claim 1 wherein the plurality of instructions, when executed, store a plurality of entitlements in the central repository of entitlements, wherein a given entitlement corresponds to at least one accessing entity of a plurality of accessing entities and controls access by the at least one accessing entity to at least one service provided by the access-controlled entity.

3. The embedded computer system as recited in claim 1 wherein the non-transitory computer accessible storage medium further stores a third plurality of instructions which, when executed:
route messages between the access-controlled entity, the accessing entity, and the central repository; and
enforce the move once requirement for the handle responsive to the move once command containing the handle.

4. The embedded computer system as recited in claim 1 wherein the accessing entity is a client and the access-controlled entity is a server.

5. A method, in an embedded computer system storing a central repository of entitlements, an accessing entity, and an access-controlled entity, comprising:
transmitting a first command from the accessing entity to the central repository requesting a handle to one or more entitlements for the accessing entity to services provided by the access-controlled entity;
responding to the first command by the central repository with the handle, which is opaque to the accessing entity whereby the accessing entity is unable to access the one or more entitlements;
transmitting, by the accessing entity, the handle to the access-controlled entity in a move once command that prevents the access-controlled entity from transmitting the handle to entities other than the central repository;
receiving a second command in the central repository of entitlements from the access-controlled entity, wherein the second command includes the handle and requests the one or more entitlements;
locating the one or more entitlements in the central repository of entitlements based on the second command;
transmitting the one or more entitlements from the central repository of entitlements to the access-controlled entity for interpretation by the access-controlled entity;
receiving the one or more entitlements in the access-controlled entity from the central repository of entitlements;
determining, by the access-controlled entity, whether or not the one or more entitlements are sufficient to permit the accessing entity to access the services provided by access-controlled entity; and
selectively permitting, by the access-controlled entity, the accessing entity to access the services provided by the access-controlled entity based on determining whether or not the accessing entity is permitted to access the services provided by the access-controlled entity, wherein the central repository securely stores and provides the one or more entitlements to the access-controlled entity and prevents the accessing entity from having visibility to the one or more entitlements.

6. The method as recited in claim 5 further comprising:
routing messages between the access-controlled entity, the accessing entity, and the central repository; and
enforcing the move once requirement for the handle responsive to the move once command containing the handle.

7. The method as recited in claim 5 further comprising:
storing a plurality of entitlements in the central repository of entitlements, wherein a given entitlement corresponds to at least one accessing entity of a plurality of accessing entities and controls access by the at least one accessing entity to at least one service provided by the access-controlled entity.

8. The method as recited in claim 5 wherein the accessing entity is a client and the access-controlled entity is a server.

9. A plurality of non-transitory computer accessible media storing instructions which, when executed on an embedded computer system storing a central repository of entitlements, an accessing entity, and an access-controlled entity:
transmit a first command from the accessing entity to the central repository requesting a handle to one or more entitlements for the accessing entity to services provided by the access-controlled entity;
respond to the first command by the central repository with the handle, which is opaque to the accessing entity whereby the accessing entity is unable to access the one or more entitlements;
transmit, by the accessing entity, the handle to the access-controlled entity in a move once command that prevents the access-controlled entity from transmitting the handle to entities other than the central repository;
receive a second command in the central repository of entitlements from the access-controlled entity, wherein the second command includes the handle and requests the one or more entitlements;
locate the one or more entitlements in the central repository of entitlements;
transmit the one or more entitlements from the central repository of entitlements to the access-controlled entity for interpretation by the access-controlled entity, wherein the access-controlled entity is configured to determine, based on the one or more entitlements, whether or not the accessing entity is permitted to access the services provided by the access-controlled entity, wherein the central repository securely stores and provides the one or more entitlements to the access-controlled entity and prevents the accessing entity from having visibility to the one or more entitlements;
receive the one or more entitlements in the access-controlled entity from the central repository of entitlements;
determine, by the access-controlled entity, if the one or more entitlements are sufficient for the accessing entity to access the services provided by the access-controlled entity; and
selectively permit, by the access-controlled entity, the accessing entity to access the access-controlled entity based on the determination of whether or not the accessing entity is permitted to access the services provided by the access-controlled entity.

10. The plurality of non-transitory computer accessible media as recited in claim 9 wherein the instructions, when executed, store a plurality of entitlements in the central repository of entitlements, wherein a given entitlement corresponds to at least one accessing entity of a plurality of accessing entities and controls access by the at least one accessing entity to at least one service provided by the access-controlled entity.

11. The plurality of non-transitory computer accessible media as recited in claim 9 further storing a third plurality of instructions which, when executed:
route messages between the access-controlled entity, the accessing entity, and the central repository; and
enforce the move once requirement for the handle responsive to the move once command containing the handle.

12. The plurality of non-transitory computer accessible media as recited in claim 9 wherein the accessing entity is a client and the access-controlled entity is a server.

\* \* \* \* \*